Oct. 10, 1950          H. V. JOHNSON          2,525,487
RELIEF DEVICE
Filed Oct. 17, 1944          2 Sheets-Sheet 1
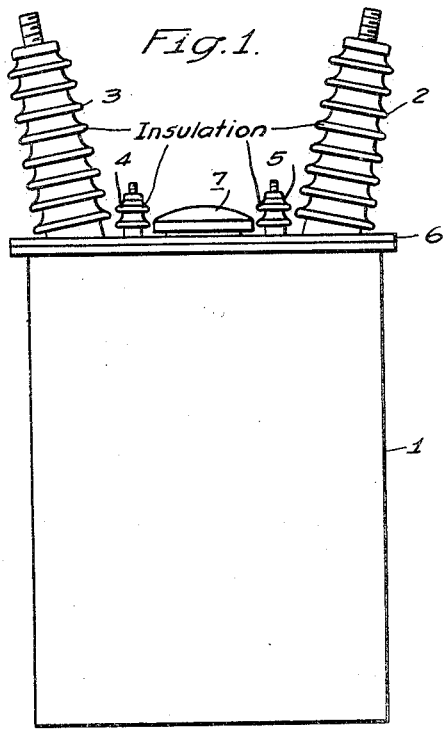
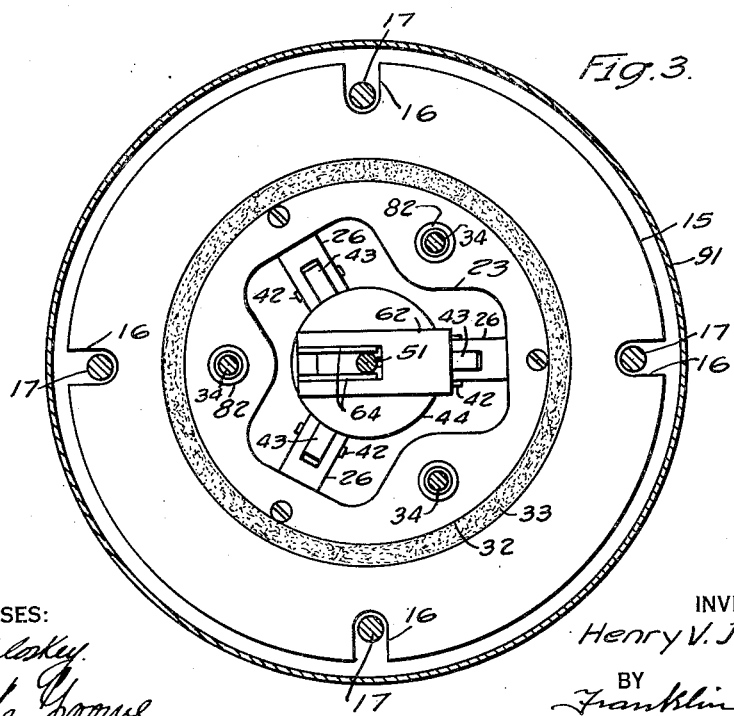
WITNESSES:
INVENTOR
Henry V. Johnson.
BY
Franklin E. Hardy
ATTORNEY Oct. 10, 1950     H. V. JOHNSON     2,525,487
RELIEF DEVICE Filed Oct. 17, 1944     2 Sheets-Sheet 2

WITNESSES:
E. A. McCloskey.
New. C. Groove

INVENTOR
Henry V. Johnson.
BY
Franklin E. Hardy
ATTORNEY

Patented Oct. 10, 1950

2,525,487

UNITED STATES PATENT OFFICE 2,525,487

RELIEF DEVICE

Henry V. Johnson, Sharon, Pa., assignor to Westinghouse Electric Corporation, a corporation of Pennsylvania Application October 17, 1944, Serial No. 559,091

8 Claims. (Cl. 137—53)

This invention relates to relief devices and particularly to such devices adapted for use on electrical apparatus such as transformers.

In electrical apparatus, such as transformers, it is customary practice to partially fill the apparatus casing with an insulating and cooling fluid, such as oil, in which the apparatus is immersed. It is also customary to provide a relief diaphragm placed at the upper part of the casing that is adapted to rupture and relieve excessive pressures from the tank or casing, such as may be caused by the disintegration of the insulating liquid due to electrical disturbances such as stewing arcs or other arc discharges caused by failure of the insulating material resulting in the formation of gas. This use of a pressure release device prevents the casing from rupturing due to excessive internal pressures therein.

Such diaphragms have been made of thin sheets of Micarta and certain metals, such as copper, aluminum, etc., and also of glass. The pressure at which such diaphragms rupture is a function of the material of which the diaphragm is made and also of the area, thickness and shape of the diaphragm. The material used and the thickness of the material is based on years of research and experience. However, due to variation in the material and to manufacturing tolerances, the rupturing point of the diaphragm cannot be determined definitely prior to manufacture. It has been the practice in the art to make a number of diaphragms from one batch of material holding the tolerances, such as dimensions, etc., as nearly as possible to a desired value and then to test a certain percentage of the diaphragms made from one batch of material to destruction, and assume or trust that the structure of the remaining diaphragms will be within certain limits of the average rupturing capacity of those tested.

If at a later date it is desired to determine the then rupturing capacity of the diaphragm which may have changed with the ageing of the material, or from subjecting the diaphragms to varying pressures less than its rupturing capacity, it is again necessary to test a certain number of such diaphragms to destruction and again assume that the rupturing pressure of the remaining diaphragms is somewhere in the vicinity of the average of those tested. Usually when this is done, the diaphragms tested are not all from the same batch of material and consequently the test results are more scattered.

It is an object of my invention to provide a relief device which avoids the above-named limitations and which may be tested at any time during its operating life to determine the pressure at which it operates and which may be adjusted at any time during its life to operate at a desired pressure.

Other objects and advantages of the invention will be apparent from the following description of a preferred embodiment of the invention, reference being had to the accompanying drawings, in which:

Figure 1 is a side elevational view of an electrical transformer embodying the invention;

Fig. 3 is a horizontal sectional view taken along the line III—III of Fig. 2 and drawn at a reduced scale from Fig. 2.

Figure 2:
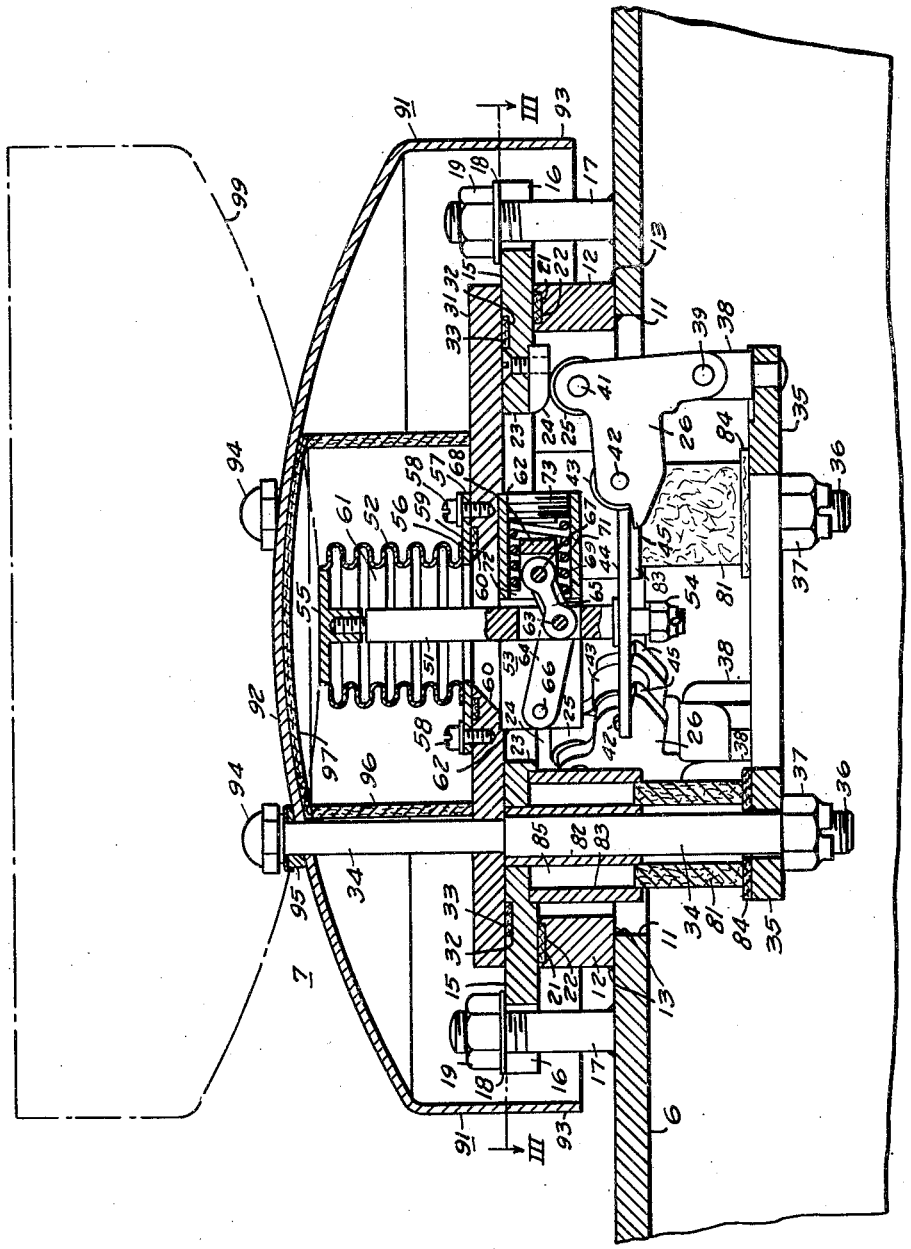
Fig. 2 is a vertical sectional view of the relief device positioned on the cover of the transformer casing.

Referring to Figure 1 of the drawings, a transformer tank or casing 1 is shown containing within the casing the electrical apparatus immersed in an insulating fluid. High voltage terminal bushings 2 and 3 and low voltage terminal bushings 4 and 5 are shown mounted upon the tank cover 6, together with the pressure relief device shown generally at 7.

Referring particularly to Fig. 2 of the drawings, a pressure relief opening 11 is provided in the tank or casing cover 6 about the outer edge of which a cylindrical manhole ring 12 is welded as shown at 13 and extends upwardly. A cover ring 15 is provided, having slots 16 at spaced intervals about its outer perimeter, as best shown in Fig. 3, and is held in position against the upper rim of the manhole ring 12 by studs 17 welded to, and extending upwardly from, the tank cover 6. Washers 18 and screw-threaded nuts 19 are applied to the upper ends of the studs 17 for retaining the cover ring 15 tightly in engagement with the manhole ring 12. An annular depression 21 is provided in the upper edge of the manhole ring 12 for accommodating a gasket 22 to effect a tight joint between the members 12 and 15. The shape of the cover ring 15 is best shown in Fig. 3 and includes an inner opening outlined as shown at 23, shown as providing three lobes and having three tracks 24, two of which are shown in Fig. 2 on the underside thereof to accommodate rollers 25 attached to latch means 26, three in number, for a purpose to be presently described.

The movable portion of the release device includes a relief cover 31 for the relief device positioned on the outer side of the cover ring 15 in which cover ring a recess 32 is provided for containing a gasket 33 that insures a tight connection between the relief cover and the cover ring to close the discharge opening extending between the apparatus casing 6 and the outside atmosphere. A plurality of pressure bolts 34, three in number being shown, are provided and are brazed or otherwise attached to the relief cover 31. The pressure bolts extend both above and below the relief cover 31. At the lower ends of the pressure bolts 34, a pressure ring 35 is provided which is spaced from and movable with the relief cover 31 through the action of the pressure bolts 34. As shown, the lower end of the pressure bolts are threaded at 36 and provided with nuts 37 beneath the pressure ring 35 for supporting the ring in the desired spaced relation below the level of the relief cover 31. Projections 38 extend upwardly at spaced intervals about the pressure ring 35 which, by means of pins 39, support the several latch means 26. The latch means 26 are shown in Fig. 2 in their normal positions, corresponding to the closed position of the relief cover 31. At the upper end of the latch means 26 a pin 41 is provided upon which is mounted the previously mentioned roller 25 that engages the track 24. In the illustrated position of the mechanism, the relief cover 31 is held tightly against the outer surface of the cover ring 15. Any pressure within the tank on the underside of the relief cover 31 tending to raise the cover is communicated through the pressure bolts 34 to the pressure ring 35 and through the several latch means 26 and rollers 25 to the cover ring 15 to prevent the upward movement of the relief cover 31 so long as the latch means 26 remain in their illustrated positions.

Each one of the latching means 26 has an inwardly extending arm carrying a pin 42 upon which a roller 43 is mounted, which roller engages the outer circumference of a latch plate 44 positioned at an elevation just above the outer projections 45 on the inwardly extending arm of the latch means 26. It will be noted that in the normal or illustrated positions of the latch means 26, the pin 41 carrying the roller 25 is slightly nearer the center or axis of the device than is the pin 39 so that as force is communicated between the pressure ring 35 and the cover ring 15 the latch means 26 will tend to rotate inwardly about the pin 39 and is prevented from doing so, so long as the latch plate 44 is in the position illustrated in Fig. 2.

Means is provided for normally retaining the latch plate 44 in its illustrated position when the pressure within the tank or casing 1 is below a predetermined value and for lifting the latch plate 44 to release the latch means 26 to cause the relief cover 31 to be raised from its seat and open communication between the interior of the casing and the outside atmosphere when the pressure within the casing exceeds a predetermined value. The means for controlling the latch plate 44 includes a trigger 51, a bellows 52 and a toggle mechanism shown generally at 53. The trigger 51 is shown in the form of a rod or shaft, the lower end of which extends centrally through an opening in the latch plate 44 and is provided with a nut 54 adjacent its lower end at an elevation such as to require a limited upward movement of the trigger 51 before the nut 54 will engage the latch plate 44. A bellows plate 55 is attached to the upper end of the trigger shaft 51 and to one end of the Sylphon bellows 52. The lower end of the bellows 52 is attached at 56 to a plate 57 that is held by screws 58 tightly against the relief cover 31. A gasket 59 is provided in an annular recess in the upper surface of the relief cover 31 to effect a tight seal between the plate 57 and the relief cover 31. An opening 60 is provided centrally of the relief cover 31 so as to permit gas within the apparatus cover to flow into the chamber 61 formed by the Sylphon bellows 52 and the end plate 55 so that the pressure within the chamber 61 will correspond to the pressure within the apparatus casing 1.

The toggle mechanism 53 is positioned adjacent the trigger shaft 51 at a point intermediate its ends and comprises a base portion 62 attached to the lower surface of the relief cover 31. The toggle mechanism includes a pin 63 carried by the trigger 51 and attached to the inner ends of a pair of toggle arms 64 and 65. The outer end of the arm 64 is attached by a pin 66 to the base portion 62 of the toggle mechanism and the outer end of the arm 65 is attached by a pin 67 to a movable plunger 68 positioned within a bore 69 formed in the base portion 62 of the toggle mechanism and adapted to move horizontally within said bore. The plunger 68 is provided with a central portion about which a spring 71 is positioned and with an end flange 72 on the inner end thereof for receiving the inner end of the spring 71. The outer end of the spring 71 engages a plug 73 screw fitted into the outer end of the bore 69 in the base structure 62 of the toggle mechanism.

A shock absorber is provided including a tube of material 81 positioned about the lower end of the pressure bolt 34 and movable therewith between two tube members 82 and 83 which are attached to and extend downwardly from the cover ring 15. When the cover 31 and the pressure ring 35 move quickly upwardly upon the tripping of the latch mechanism, the cylindrical tube 81 moves into the chamber 85 between the tubes 82 and 83 against the entrapped gas within this chamber. The upward movement of the tube 81 causes this gas to be compressed and to effect a downward force on the upper end of the tube 81 which is communicated through the washer 84 to the pressure ring 35, thus retarding the upward movement of the pressure ring 35 and relief cover 31. One such shock absorber is associated with each of the pressure bolts 34.

A hood 91 having a generally dome-shaped top 92 and a downwardly extending flange 93 is mounted upon the upper ends of the pressure bolts 34 and held in position thereon by cap nuts 94 engaging cushioning or washer elements 95 between the cap nut and the hood.

The hood moves with the relief cover 31 to which the pressure bolts 34 are attached. The lining of suitable material including a cylindrical member 96 is shown about the pressure bellows 52 surrounding the area inside of the pressure bolts 34 between the relief cover 31 and the hood 91 and also including a top portion 97 lining the interior of the dome-shaped portion 92 of the hood.

During normal operation of the electrical transformer, the various parts of the relief device will be as shown in Fig. 2. As the pressure in the apparatus casing increases, the pressure in the chamber 61 of the tripping bellows 52 correspondingly increases, tending to raise the bellows end plate 55 and the trigger member 51 upwardly. So long as the pressure within the apparatus casing is below the desired value at which the relief device will trip, the trigger 51 is retained in its illustrated position by the toggle mechanism 53. The downward component of force from the arms 64 and 65 on the pin 63 caused by the pressure of the spring 71 is sufficient to overcome the upward pressure caused by the bellows 52 so long as the pressure within the apparatus casing is below the particular pressure at which the upward force of the bellows 52 will overcome the downward force of the spring 71 on the pin 63 carried by the trigger 51. This downward force is adjusted by adjusting the plug 73 which is adapted to be moved within the bore 69 to increase or decrease the pressure on the spring 71. If the pressure within the apparatus casing and which is applied to the bellows 52 increases sufficiently to cause the upward force on the pin 63 to increase to a value sufficient to move the pin 63 upwardly against the downward force of the toggle mechanism, the downward force on the pin 63 caused by the inherent characteristics of the toggle mechanism 53 disappears very rapidly thus permitting the bellows 52 to move the trigger 51 rapidly in an upward direction. The plunger 68, attached to the outer end of the arm 65 will be moved to the right, as viewed in Fig. 2, against the force of the spring 71 until the pin 63 is in the plane of the pivot pins 66 and 67.

During this movement, the nut 54 on the lower end of the trigger shaft 51 engages the underside of the latch plate 44, moving it upwardly from engagement with the rollers 43 thus permitting each of the latch members 26 to move inwardly and downwardly about the pin 39. This movement is caused by the component of force applied between the pressure ring 35 and the relief cover 31 which is communicated through the pivot members 39 and 41 and the roller 25 to the track 24. As the several latch members 26 each rotate about the pin 39 in the above-described manner, the roller 25, which moves inwardly and downwardly, disengages the track 24 thus releasing the pressure normally applied from the pressure ring 35 through the pressure bolts 34 to retain the relief cover 31 for holding it in closed position, and permitting the entire structure attached to these bolts 34 to move upwardly due to the pressure within the tank against the underside of the relief cover 31. The gas within the apparatus cover is thus permitted to escape through the pressure opening shown at 11, and between the raised relief cover 31 and the cover ring 15 into the space beneath the hood 91 and past the outer rim of the hood to the atmosphere.

After the pressure device has so operated, it is again manually returned to the position illustrated in Fig. 2, to be ready for another operation when required. This is done in the following manner. The hood 91 is removed to give access to the nuts 19 on the studs 17. The nuts 19 are then removed allowing the relief device assembly including the cover ring 15, the cover plate 31, the pressure bolts 34 and the parts attached thereto to be raised from the apparatus cover. The assembly is then turned upside down to allow the latch means 26 to drop back by gravity to their normal positions with the rollers 25 against the tracks 24. In order to provide freedom of movement for the several latch means 26 to return to their normal positions, the nuts 37 are loosened on the bolts 34 to allow each latch means 26 to more readily position itself between the pressure ring 35 and the cover ring 15. The pressure ring 35 and cover plate 31 will then be moved in a direction to close the cover plate 31 against the cover ring 15. The hood 91 may be temporarily attached in its reverse position (shown in broken lines in Fig. 2) so that the dome-shaped top 92 is forced against the bellows plate 55, forcing the trigger shaft 51 against the force of the toggle mechanism 53 in its released position, to return it to its reset or illustrated position and to return the latch plate 44 to its illustrated position between the rollers 43 carried by the latch means 26. The nuts 37 on the ends of the pressure bolts are then tightened against the pressure ring 35 to bring the rollers 25 carried by the latch means 26 tightly against the tracks 24 on the cover ring 15 and force the cover plate 31 tightly into position against the gasket 33 in the cover ring 15. The relief device assembly is then turned right side up and replaced on the cover of the apparatus casing. The nuts 19 are replaced on the studs 17 and tightened to hold the cover plate 15 tightly against the gasket 22 in the manhole ring 12. The hood 91 is then removed from its reversed position shown in broken lines and replaced in its normal position shown in full lines in Fig. 2.

The pressure device may be tested at any time during its life by applying pressure to the apparatus sufficient to cause the relief device to operate and by measuring the pressure required to operate it. If the device operates at a pressure other than that desired, the toggle spring 71 may be adjusted by screw threading the plug 73 further into or further out of the bore in which it is positioned to adjust the tension of the spring 71 to the value necessary to effect operation of the device at the desired pressure.

It occasionally becomes desirable to test the apparatus casing for tightness above the pressure at which the pressure relief device trips. When it is desired to do this, the cap nuts 94 at the top of the pressure bolts 34 are removed and the hood 91 is removed from its normal position and turned upside down and reattached in the position shown in the dot and dash line 99. In this position of the hood, the central dome-shaped portion 92 thereof engages the bellows plate 55 at the end of the tripping bellows 52, thus preventing the bellows from expanding due to the pressure within the chamber 61, and preventing the trigger 51 from being moved above its illustrated position, making the tripping mechanism inoperative. In this position of the hood, the relief device cannot trip to relieve the pressure within the tank. The hood should, therefore, always be applied with the outer rim 93 thereof extending downwardly about the operating mechanism of the device when put into service.

Modifications in the apparatus illustrated and described will occur to those skilled in the art and I do not wish to be limited otherwise than by the scope of the appended claims.

I claim as my invention:

1. A casing having a discharge opening therein, a pressure retainer and relief device having a relief cover normally positioned for closing said discharge opening, means for normally holding said relieve cover in closed position including latch means normally positioned for communicating pressure applied to the inner side of the relief cover to the casing to retain the relief cover in closed position and a latch plate for normally retaining the latch in latched position, and means operative upon a predetermined pressure within the casing for operating the latch plate to release the latch and effect the operation of said relief cover to establish communication between the inside of the casing and the outside atmosphere, a plurality of pressure bolts attached to the latch plate and extending upwardly from the relief cover and a hood mounted on the upper ends thereof and extending over and downwardly about the relief cover and the operating mechanism for operating the latch plate.

2. A casing having a discharge opening therein, a pressure retainer and relief device having a relief cover normally positioned for closing said discharge opening, means for normally holding said relief cover in closed position including a cover ring disposed about the opening and fixedly attached to the casing cover in spaced relation thereto and against the outer side of which the relief cover is retained, a pressure ring supported from the relief cover within the casing below the cover ring, latch means normally positioned between the pressure ring and the cover ring for holding the relief cover tightly against the outer surface of the cover ring, a latch plate for normally holding the latch means in latching position, and means operative upon a predetermined pressure within the casing for operating the latch plate to release the latch means and effect the operation of said relief cover by the pressure within the casing to open the discharge opening of the casing.

3. A casing having a discharge opening therein, a pressure retainer and relief device having a relief cover normally positioned for closing said discharge opening, means for normally holding said relief cover in closed position including latch means normally positioned for communicating pressure applied to the inner side of the relief cover to the casing to retain the relief cover in closed position and a latch plate for normally retaining the latch in latched position, and means for operating the latch plate to release the latch means and effect the movement of the retainer cover to an open position comprising a trigger shaft having one end extending through an opening in the latch plate and the other end extending upwardly, a tripping bellows responsive to the pressure within the casing and operatively connected to the upper end of the trigger shaft, and means including a toggle mechanism for normally biasing said trigger shaft downwardly against the force of the tripping bellows and subject upon a predetermined pressure on the tripping bellows to be abruptly actuated upwardly thereby for actuating the latch plate to release the latch.

4. A casing having a discharge opening therein, a pressure retainer and relief device having a relief cover normally positioned for closing said discharge opening, means for normally holding said relief cover in closed position including a cover ring fixedly attached to the casing exteriorly thereof and against the outer side of which the relief cover is retained, a pressure ring supported from the relief cover within the casing below the cover ring, a plurality of latch means pivotally mounted on the cover ring normally positioned between the pressure ring and the cover ring for holding the relief cover tightly against the outer surface of the cover ring, a latch plate normally positioned between the several latch means for holding them in latching position, and means for operating the latch plate to release the latch means and effect the movement of the relief cover to an open position comprising a trigger shaft having one end extending through an opening in the latch plate and a toggle mechanism connected to said trigger for normally biasing the trigger to an inactive position, and a tripping bellows responsive to the pressure within the casing for actuating the trigger against the bias of the toggle mechanism for actuating the latch plate to release the latch means.

5. A casing having a discharge opening therein, a pressure retainer and relief device having a relief cover normally positioned for closing said discharge opening, means for normally holding said relief cover in closed position including latch means normally positioned for communicating pressure applied to the inner side of the relief cover to the casing to retain the relief cover in closed position and a latch plate for normally retaining the latch in latched position, and means for operating the latch plate to release the latch means and effect the movement of the relief cover to an open position comprising a trigger shaft having one end extending through an opening in the latch plate and the other end extending upwardly, a tripping bellows responsive to the pressure within the casing and operatively connected to the upper end of the trigger shaft, and means including a toggle mechanism for normally biasing said trigger shaft downwardly against the force of the tripping bellows and subject upon a predetermined pressure on the tripping bellows to be abruptly actuated upwardly thereby for actuating the latch plate to release the latch, a plurality of pressure bolts attached to the relief cover and a hood mounted on the upper ends thereof and extending over and downwardly about the relief cover and the trigger operating mechanism.

6. A casing having a discharge opening therein, a pressure retainer and relief device having a relief cover normally positioned for closing said discharge opening, means for normally holding said relief cover in closed position including latch means normally positioned for communicating pressure applied to the inner side of the relief cover to the casing to retain the relief cover in closed position and a latch plate for normally retaining the latch in latched position, and means for operating the latch plate to release the latch means and effect the movement of the relief cover to an open position comprising a trigger shaft having one end extending through an opening in the latch plate and the other end extending upwardly, a tripping bellows responsive to the pressure within the casing and operatively connected to the upper end of the trigger shaft, and means including a toggle mechanism for normally biasing said trigger shaft downwardly against the force of the tripping bellows and subject upon a predetermined pressure on the tripping bellows to be abruptly actuated upwardly thereby for actuating the latch plate to release the latch, a plurality of pressure bolts attached to the relief cover and extending downwardly therefrom, and shock absorbing means cooperating therewith to retard the upward movement of the relief cover upon release of the latch means.

7. A casing having a discharge opening therein, a pressure retainer and relief device having a relief cover normally positioned for closing said discharge opening, means for normally holding said relief cover in closed position including a cover ring fixedly attached to the casing exteriorly thereof and against the outer side of which the relief cover is retained, a pressure ring supported from the relief cover within the casing below the cover ring, a plurality of latch means normally positioned between the pressure ring and the cover ring for holding the relief cover tightly against the outer surface of the cover ring, each of the latch means having a roller carried at its upper end for engaging a separate track provided on the relief cover, and each latch means having an inwardly extending arm having a roller mounted thereon, a horizontal latch plate normally positioned against the last-named rollers for normally holding the latch means in latching position, and means operative upon a predetermined pressure within the casing for operating the latch plate to release the latch means and effect the operation of said relief cover.

8. A casing having a discharge opening therein, a pressure retainer and relief device having a relief cover normally positioned for closing said discharge opening, means for normally holding said relief cover in closed position including latch means normally positioned for communicating pressure applied to the inner side of the relief cover to the casing to retain the relief cover in closed position and a latch plate for normally retaining the latch in latched position, and means for operating the latch plate to release the latch means and effect the movement of the relief cover to an open position comprising a trigger shaft having one end operatively connected for operating the latch plate and the other end operatively connected to a tripping bellows responsive to the pressure within the casing, and a spring biased toggle mechanism normally biasing said trigger shaft against the force of the tripping bellows, and subject, upon a predetermined pressure on the tripping bellows, to be abruptly operated for actuating the latch plate to release the latch means.

HENRY V. JOHNSON.

REFERENCES CITED

The following references are of record in the file of this patent:

UNITED STATES PATENTS

| Number | Name | Date |
| --- | --- | --- |
| 201,468 | Tregoning et al. | Mar. 19, 1878 |
| 1,143,669 | Watrous | June 22, 1915 |
| 1,418,530 | Burnham | June 6, 1922 |
| 1,526,512 | Teten | Feb. 17, 1925 |
| 1,792,302 | Hilliard | Feb. 10, 1931 |
| 1,840,060 | Snow | Jan. 5, 1932 |
| 1,897,076 | Shand | Feb. 14, 1933 |
| 1,963,518 | Bradley | June 19, 1934 |
| 2,070,661 | Hughes | Feb. 16, 1937 |
| 2,297,003 | Larson | Sept. 29, 1942 |
| 2,367,989 | Alders | Jan. 23, 1945 |